United States Patent [19]

Watkins

[11] Patent Number: 4,737,296

[45] Date of Patent: Apr. 12, 1988

[54] FOAMING ACID-CONTAINING FLUIDS

[75] Inventor: David R. Watkins, Irvine, Calif.

[73] Assignee: Union Oil Company of California, Los Angeles, Calif.

[21] Appl. No.: 834,884

[22] Filed: Feb. 28, 1986

Related U.S. Application Data

[63] Continuation-in-part of Ser. No. 664,986, Oct. 26, 1984, abandoned, which is a continuation-in-part of Ser. No. 304,354, Sep. 22, 1981, abandoned.

[51] Int. Cl.$^4$ .................. E21B 43/27; E21B 37/00
[52] U.S. Cl. .................. 252/8.553; 166/307; 252/8.552; 252/87
[58] Field of Search .......... 252/8.55 R, 8.55 B, 252/8.55 C, 547, 82, 87, 8.551, 8.552, 8.553; 166/307

[56] References Cited

U.S. PATENT DOCUMENTS

| | | |
|---|---|---|
| 3,794,523 | 2/1974 | Thompson .................. 252/8.55 X |
| 3,849,348 | 11/1974 | Hewitt .................. 252/547 |
| 3,937,283 | 2/1976 | Blauer et al. .................. 166/307 |
| 4,044,833 | 8/1977 | Volz .................. 166/307 |
| 4,113,631 | 9/1978 | Thompson .................. 252/8.55 |
| 4,174,304 | 11/1979 | Flanagan .................. 252/547 X |
| 4,201,678 | 5/1980 | Pye et al. .................. 252/8.5 |
| 4,322,306 | 3/1982 | Dill .................. 252/8.55 |

Primary Examiner—Herbert B. Guynn
Attorney, Agent, or Firm—Dean Sandford; Gregory F. Wirzbicki; Robert A. Franks

[57] ABSTRACT

Foamed treating fluids contain an acid component, a gas, optionally an organic solvent and emulsifying agent, and, as a foaming agent, a mixture of a quaternary ammonium halide cationic surface active agent and either an alkylamido alkylamine oxide surface active agent or a betaine amphoteric surface active agent. Such treating fluids can be used to dissolve acid-soluble components from various surfaces, such as a subterranean reservoir penetrated by a well, the well itself, or an industrial vessel or conduit containing a scale.

41 Claims, No Drawings

FOAMING ACID-CONTAINING FLUIDS

CROSS-REFERENCE TO RELATED APPLICATIONS

This application is a continuation in part of Ser. No. 664,986, filed Oct. 26, 1984 and now abandoned, which itself is a continuation in part of Ser. No. 304,354, filed Sept. 22, 1981 and now abandoned.

BACKGROUND OF THE INVENTION

1. Field of the Invention

This invention relates to the removal of acid-soluble substances from various media, and particularly to foam treating fluids useful for contacting permeable or impervious media to dissolve a portion of the media surfaces or materials deposited therein or thereon to increase the permeability of the media, or to clean the media, and more particularly useful for dissolving acid-soluble portions of a subterranean geological reservoir, acid-soluble materials previously deposited in the reservoir or a well and, in some embodiments, also of dissolving organic materials present in the reservoir or a well, as well as dissolving scale from an industrial vessel or conduit.

2. Description of the Art

It has long been known to contact various solid media with a treating fluid capable of dissolving portions of the media or materials present in or on the surface. If a medium is permeable, such as a subterranean reservoir or a screen in a well, the treating fluid can increase the permeability therethrough. If a medium is impermeable, such as an industrial vessel or conduit, the treating fluid cleans the surface. Typical of such treating solutions is an aqueous solution of a mineral acid capable of dissolving carbonates present in a reservoir or scale and other inorganic materials previously deposited in the reservoir or vessel by fluids flowing therethrough. It is also known to remove from such media organic materials such as paraffins, viscous oil, tar, wax, asphaltenes, and resin precipitates of petroleum origin, by contacting the media with a treating fluid containing both a water-soluble acid component and an oil-soluble organic solvent, such as crude oil or a fraction thereof. Such treating fluids typically also contain a surface active agent and are in emulsion or dispersed form. Such emulsions or dispersions are often relatively easy to form with any one of a number of anionic, cationic, nonionic, or amphoteric foaming agents.

In order to minimize the liquid volume of treating fluid required for a given treatment and decrease the density of the treating fluid, it is known to add to a liquid treating fluid a foaming agent and a gas to form a relatively large volume of foamed treating fluid.

U.S. Pat. No. 3,572,440 to Hutchison et al. discloses a preformed well circulation foam containing water, a mineral acid or lower organic acid component, a gas and an organic foaming agent. Suitable foaming agents are anionic (preferred), cationic, nonionic and amphoteric agents. Mixtures of two or more foaming agent species are contemplated and a mixture of alkylbenzene sulfonic acids and alpha-olefin sulfonic acids is preferred.

Certain cationic quaternary ammonium compounds have been suggested for use in well-acidizing compositions for purposes other than forming a foam.

U.S. Pat. No. 3,932,296 to Byth describes a corrosion inhibitor for hydrochloric acid used in acidizing formations which inhibitor is a mixture of (1) the reaction product of a particular nitrogen compound such as an alkyl amine, an aldehyde, a fatty acid and a first quaternary ammonium compound, and (2) a second quaternary ammonium compound which is different from the first such compound.

U.S. Pat. No. 4,201,678 to Pye et al. describes an aqueous foam drilling fluid for high temperature reservoirs employing as a foaming agent a mixture of an amphoteric betaine and a salt of a linear aliphatic or alkyl aryl hydrocarbon sulfonate. Neither acid nor solvent is used in the drilling fluid.

Foams containing only water, an acid component, and a gas are relatively easy to form. Any one of a wide variety of types of foaming agents can be used. When an organic solvent component and an emulsifying agent are also employed in the composition and the resulting emulsion or dispersion foamed, the foam is more difficult to form and a more effective and different foaming agent is often required. Also, it is common practice in many instances to employ either type of foam under conditions adverse to its stability, e.g., pumping it several thousand feet down a well and into the surrounding reservoir which is at an elevated temperature and pressure, contacting the foam with crude oil and/or aqueous solutions containing calcium chloride, and the like, or introducing it into a vessel or conduit at elevated temperature and/or pressure. Such conditions require that an especially effective foaming agent be used if the foam is to remain stable long enough for the treatment to be completed. In many foamed treating agent compositions containing an acid component, various other additives are employed to impart a number of attributes to the fluid. Such additives are often adverse to foam stability. Examples of such additives include corrosion inhibitors, antisludge agents, and emulsifying agents, commonly used in well-acidizing treating treating fluids. When an acid-containing foamed treating agent dissolves components of a scale or formation rock, the dissolved components sometimes decrease foam stability.

While each of the aforementioned compositions has met with some success in particular applications, the need exists for a further improved foamed treating fluid composition and method.

Accordingly, a principal object of this invention is to provide a composition and method for forming a stable foamed treating fluid containing an acid component.

Another object of this invention is to provide such a composition which also contains organic solvent and emulsifying agent components.

Yet another object of this invention is to provide such a composition which remains stable and effective even though it contains or becomes admixed with or dissolves additives or contaminants which are adverse to the stability of the foam.

A further object of this invention is to provide a method for using a foam treating fluid in treating subterranean reservoirs or wells or cleaning industrial vessels or conduits.

Other objects, advantages and features of this invention will become apparent to those skilled in the art from the following description and appended claims.

SUMMARY OF THE INVENTION

Briefly, this invention provides a composition and method for treating solid surfaces with a foamed treating fluid containing: about 5 to 99 parts by weight of an aqueous solution of an acid component, containing about 1 to 70 parts by weight acid and about 30 to 99 parts by weight water; about 0.04 to 1,200 parts by weight of a gas; and about 0.1 to 10 parts by weight of a foaming agent, comprising a mixture of about 0.01 to 9.5 parts by weight of a quaternary ammonium cationic surface active agent, and about 0.01 to 9.5 parts by weight of either an alkylamido alkylamine oxide surface active agent or an amphoteric betaine surface active agent having the formula:

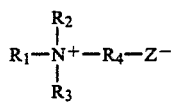

wherein $R_1$ is a high molecular weight alkyl radical having from 10 to 18 carbon atoms, $R_2$ and $R_3$ are each alkyl radicals having from about 1 to 3 carbon atoms, $R_4$ is an alkylene or hydroxyalkylene radical having from 1 to 4 carbon atoms, and Z is an anion selected from the group consisting of $SO_3^=$ and $COO^=$ radicals. Optionally, the treating fluid can also contain about 1 to 95 parts by weight of an organic solvent component selected from the group consisting of polar solvents, hydrocarbon solvents, halogenated hydrocarbon solvents, and mixtures thereof, and an effective amount, for example about 0.05 to 5 parts by weight per 100 parts by weight of organic solvent components and acid component combined, of an emulsifying agent selected from the group consisting of water-soluble anionic, cationic, nonionic, and amphoteric surface active agents.

The foamed treating fluid can be used to increase the permeability of subterranean reservoirs and filter media present in wells penetrating such subterranean reservoirs, and to remove scale or deposits from industrial vessels and conduits.

DETAILED DESCRIPTION OF THE INVENTION

In treating subterranean reservoirs and filter media present in wells penetrating such subterranean reservoirs with a treating fluid to improve fluid-flow in the vicinity of the well, and in using such treating fluid to remove scale from industrial vessels and conduits, there are common problems. It is oftentimes desirable to minimize the liquid volume of treating fluid required to carry out a job by employing the treating fluid in the form of a foam. Under the various conditions of use, e.g., high temperature, contact with contaminants, and presence of various additives in the treating fluid, stability of the foam is difficult to maintain. Therefore, an especially effective foaming agent is required.

In brief, the foamed treating fluid of this invention contains: (1) about 5 to 99 parts by weight, preferably about 25 to 95 parts by weight, of an aqueous solution of an acid component containing (a) about 1 to 70 parts by weight, preferably about 5 to 40 parts by weight of an acid and (b) about 30 to 99 parts by weight, preferably about 45 to 85 parts by weight, of water; (2) about 0.04 to 1,200 parts by weight, preferably about 10 to 800 parts by weight, of a gas; and (3) about 0.1 to 10 parts by weight, preferably about 0.2 to 5 parts by weight, of a foaming agent comprising a mixture of: (a) about 0.01 to 9.5 parts by weight, preferably about 0.1 to 5.0 parts by weight, of certain quaternary ammonium surface active agents and (b) about 0.01 to 9.5 parts by weight, preferably about 0.1 to 5 parts by weight, of either an alkylamido alkylamine oxide surface active agent or an amphoteric betaine surface active agent. Optionally, the treating fluid can also contain: (4) about 1 to 95 parts by weight, preferably about 5 to 40 parts by weight, of an organic solvent component; and (5) an effective amount, preferably about 0.05 to 5 parts by weight per 100 parts by weight organic solvent component and acid component combined, of an emulsifying agent.

The acid component used in the foam composition of this invention can be any acid capable of dissolving portions of subterranean reservoirs, for example, carbonates or silicates, or dissolving scale occurring in wells, industrial vessels and conduits, for example, carbonates, sulfates, oxides, silicates, and the like. The acid component can be a mineral acid selected from the group consisting of hydrochloric, phosphoric, nitric, sulfuric, and hydrofluoric acids, or mixtures thereof, or an organic carboxylic acid which forms a water-soluble or acid-soluble salt of an alkali metal and an alkaline earth metal, for example, an acid selected from the group consisting of formic, acetic, chloroacetic, peracetic, trichloroacetic, tartaric, citric, oxalic, and maleic acids, or mixtures thereof. Although the order of mixing the components of the foam is not critical, it is preferred to dilute the concentrated acid component with the required amount of water to provide an aqueous solution of the acid component having the desired acid strength and to use this aqueous solution in generating the foam. When mineral acids are used, such solutions typically have pH values of 1 or less, while organic acid solutions typically have somewhat higher values, e.g., pH about 3 or less. Some water-soluble acids are commercially available at 100 percent concentration. Other water-soluble acids are commercially available in aqueous solution at various concentrations. Regardless of the form of acid used, it is preferred that the foam composition of this invention contains, in part, about 1 to 70 parts by weight acid and about 30 to 99 parts by weight water.

The gas which is used to generate the foam can be any gas, although it is preferred to use an inert easily available gas such as air, any other free-oxygen containing gas, nitrogen, natural gas, methane, butane, or carbon dioxide. Air and nitrogen are preferred. Due to the compressibility of the gas, there is a large difference in the volume composition of the foam depending on whether it is determined at atmospheric conditions or at the conditions of use where the temperature may be several hundred degrees Fahrenheit and the pressure may be several thousand pounds per square inch, such as at the bottom of a well. In the description herein, foam treating fluid composition is expressed at standard conditions of temperature and pressure. It is to be understood that the volume composition may be different when the treating fluid contacts the media to be treated, especially in wells which are generally at elevated pressure. The aqueous foam treating fluid contains about 0.04 to 1,200 parts by weight of gas as measured at standard conditions of temperature and pressure.

The quaternary ammonium cationic surface active agent component of the foaming agent mixture comprises an organic nitrogen compound in which the molecular structure includes a nitrogen atom attached to four individual organic groups, multivalent nitrogen ring compounds such as lauryl pyridinium chloride, and the like. Selected classes of quaternary ammonium compounds include those generally corresponding to the formulas

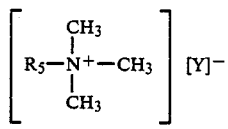

and

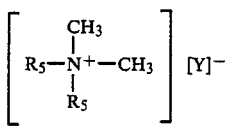

wherein the $R_5$ groups can be the same or different organic groups such as straight, branches, or cyclic, saturated or unsaturated, substituted or unsubstituted groups containing from about 2 to about 18 carbon atoms, and Y is an anion such as chloride, iodide, bromide, sulfate and the like. Specific quaternary compounds which can be employed include, for example, alkyl benzyl dimethyl ammonium chloride wherein the alkyl group contains from about 8 to about 18 carbon atoms; alkyl trimethyl ammonium chloride wherein the alkyl group is selected from octyl, nonyl, decyl, dodecyl, tridecyl, tetradecyl, hexadecyl, octadecyl, octadecenyl, octadecadienyl; dialkyl dimethyl ammonium chloride wherein the alkyl groups are the same or different members of the groups of alkyl radicals set forth above in describing the alkyl trimethyl ammonium chloride; quaternary ammonium chlorides, corresponding to the formula

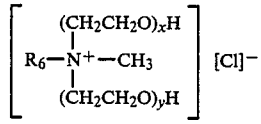

wherein $R_6$ is a $C_3$ to $C_{18}$ hydrocarbon and x and y can range from about 1 to 20, mixtures of the various quaternary ammonium compounds, and the like.

The alkylamido alkylamine oxide component of the surface active agent mixture can be prepared by the condensation of a carboxylic acid with a di- or polyamine or by condensation of such an amine in the presence of an oxidizing agent such as hydrogen peroxide. Amide-linked trialkylamine oxides are formed by the oxidation of tertiary amines with hydrogen peroxide, while hydroxylamines are formed by oxidizing primary and secondary amines. Formulae of suitable alkylamido alkylamine oxides include:

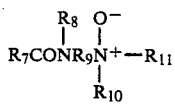

wherein $R_7$ is an alkyl group containing 1 to about 18 carbon atoms (more preferably about 12 to about 18 carbon atoms), $R_8$ is hydrogen or a substituted or unsubstituted, branched or unbranched alkyl group containing 1 to about 18 carbon atoms, $R_9$ is a substituted or unsubstituted, branched or unbranched alkylene group containing 1 to about 18 carbon atoms, and $R_{10}$ and $R_{11}$ are each substituted or unsubstituted, branched or unbranched alkyl groups containing 1 to about 18 carbon atoms. Substituents in $R_9$, $R_{10}$, and $R_{11}$ can include, without limitation, amine oxide, hydroxyl, ethylene oxide, halide, carboxy, sulfoxy, phosphonate, and alkoxy groups. In certain of these compounds, $R_7$ can be derived from coconut, oleic, stearic, or tall oil acids.

In the foaming agent mixture there may be used in place of the alkylamido alkylamine oxide surface active agent an amphoteric betaine having the formula:

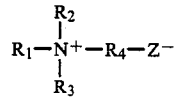

wherein $R_1$ is a high molecular weight substituted or unsubstituted alkyl radical having from 10 to 20 carbon atoms, $R_2$ and $R_3$ are each substituted or unsubstituted alkyl radicals having from about 1 to 3 carbon atoms, $R_4$ is an alkylene or hydroxyalkylene radical having from 1 to 4 carbon atoms, and Z is an anion selected from the group consisting of $SO_3^=$ and $COO^=$ radicals. Where the anion is $COO^=$, the compound is a 1-carboxy-N,N,N-trialkylalkanaminium hydroxide inner salt, and where the anion is $SO_3^=$, the compound is a 1-sulfo-N,N,N-trialkylalkanaminium hydroxide inner salt.

The name "betaine" was originally used to designate completely methylated glycine, $(CH_3)N^+$—$CH_2$—$CO$—$O^-$. As used herein, the term "amphoteric betaine" includes certain N-trialkyl derivatives of amino acids, or internal (intramolecular) salts of quaternary ammonium oxonium and sulfonium bases corresponding to the above formula.

Examples of amphoteric betaines which can be useful herein include the high alkyl betaines such as coco dimethyl carboxymethyl betaine, lauryl dimethyl carboxymethyl betaine, lauryl dimethyl alphacarboxyethyl betaine, cetyl dimethyl carboxymethyl betaine, lauryl bis-(2-hydroxyethyl) carboxymethyl betaine, oleyl dimethyl gamma-carboxypropyl betaine, lauryl bis-(2-hydroxypropyl) alpha-carboxy ethyl betaine, ammonium salts of the foregoing and the like. Specific sulfobetaines include coco dimethyl sulfopropyl betaine, stearyl dimethyl sulfopropyl betaine, lauryl bis-(2-hydroxyethyl) sulfopropyl betaine and the like.

Useful amido betaines and amidosulfo betaines include those in which $R_1$ is an amido group, such as a group having the forumula:

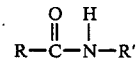

wherein R is a substituted or unsubstituted alkyl radical having about 10 to about 20 carbon atoms and R' is an alkylene radical having about 2 to about 4 carbon atoms or is a cycloalkylene radical. Representative amido betaine compounds include cocoamidocarboxymethyl betaine, oleylamidocarboxymethyl betaine, myristyloamidocarboxymethyl betaine, cocoamidocarboxypropyl betaine, cocoamidoglycine betaine, and the like. The term "coco," as used herein, refers to groups derived from the fatty acids contained in coconut oil.

One particularly useful compound is generically named "cocoamido betaine" and prepared from dimethylaminopropylamine, coconut oil fatty acid, and sodium chloroacetate. The compound is described in U.S. Pat. Nos. 3,849,348 and 4,438,045 as having the formula:

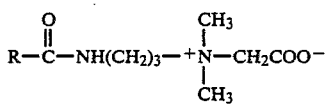

wherein R is the coco group.

Foaming agents are often commercially available as a solution in water or some other solvent at less than 100 percent by weight activity, for example, 30 to 50 percent active. In this discussion, the concentration of the foaming agents is expressed in terms of the total amount of active material present. Since the amount of foaming agent employed is small compared to the amount of the aqueous solution of the acid component and the other components of the foam, the amount of water or other solvent contributed to the foam composition by less than 100 percent active foaming agents is small and is ignored.

Broadly, the foaming agent mixture comprises about 0.01 to 9.5 parts by weight of a quaternary ammonium halide cationic surface active agent and about 0.01 to 9.5 parts by weight of either an alkylamido alkylamine oxide surface active agent or an amphoteric betaine. Preferably, the foaming agent mixture comprises about 0.1 to 5 parts by weight of agent mixture of the quaternary ammonium halide and about 0.1 to 5 parts by weight of either the alkylamido alkylamine oxide or the amphoteric betaine.

The organic solvent component which optionally can be used in the foam composition can be a hydrocarbon solvent, halogenated hydrocarbon, or a polar solvent or mixtures thereof.

Hydrocarbon solvents such as petroleum solvents, petroleum ether, petroleum naphtha, gasoline, petroleum spirit, varnish makers' and painters' naphtha, mineral spirit, kerosene, turbine fuel, high solvency petroleum naphthas, butanes, 2,2-dimethylbutane, n-hexane, isohexane, n-heptane, isooctane, isoheptane, pentene-1, pentene-2, mixed pentenes, isoheptene, isooctenes, naphthas, benzene, toluene, toluene substitutes, xylene, solvent naphthas, ethylbenzene, diethylbenzene, isopropylbenzene, amylbenzene, diamylbenzene, triamylbenzene, tetraamylbenzene, dikerylbenzene-12, amyltoluene, cyclohexane, methylcyclohexane, tetrahydronaphthalene, decahydronaphthalene, diphenyl, coal-tar creosote, turpentine, terpene solvents, dipentene, pinene, p-cymene, p-menthane, pine oils, tall oils, and crude oils are suitable.

Halogenated hydrocarbons, such as methyl bromide, methyl chloride, dichloromethane, chloroform, carbon tetrachloride, ethyl chloride, ethylene dibromide, ethylene chlorobromide, ethylene dichloride, dichloroethylene, β-trichloroethane, trichloroethylene, trichloroethane, tetrabromoethane, 1,1,2,2-tetrachloroethane, tetrachloroethylene, pentachloroethane, hexachloroethane, isopropyl chloride, allyl chloride, propylene dichloride, mixed amyl chloride, n-amyl chloride, dichloropentanes, n-hexyl chloride, monochlorohydrin, dichlorohydrin, epichlorohydrin, glycerol alphamonochlorohydrin, glycerol alpha, gamma dichlorohydrins, monobromobenzenes, dibromobenzene, monochlorobenzene, o-dichlorobenzene, trichlorobenzene, o-chloronaphthalene, monoamyl chloronaphthalene, diamyl chloronaphthalene, dichloroethylether, dichlorodiisopropyl ether, triglycol dichloride, halowax oils, dichlorodifluoromethane, difluorochloroethane, fluorodichloromethane, fluorotrichloromethane, trifluorotrichloroethane, dichlorotetrachloroethane, and ethylidene fluoride can be used.

Polar solvents and mixtures thereof which can be employed include alcohols, ketones, ethers and esters. Alcohols such as methanol, ethanol, n-propanol, isopropanol, n-butanol, isobutanol, sec-butanol, tert-butanol, fusel oil, primary amyl alcohol, pentasol, n-amyl alcohol, sec-amyl alcohol, sec-n-amyl alcohol, methyl amyl alcohol, 2-ethylbutyl alcohol, heptanol-2, heptanol-3, 2-ethylhexanol, capryl alcohol, nonyl alcohol, nonyl alcohol derivatives, diisobutyl carbinol, n-decanol, undecanol, trimethylnonyl alcohol, tetradecanol, heptadecanol, phenol, benzyl alcohol, cyclohexanol, methylcyclohexanol, trimethylcyclohexanol, 4-tert-amyl cyclohexyl alcohol, dimethyl tolyl carbinol, furfuryl alcohol, tetrahydrofurfuryl alcohol, ethylene glycol, propylene glycol, diethylene glycol, dipropylene glycol, trimethyl glycol, triethylene glycol, polyethylene glycols, polypropylene glycol 150, 2-methyl-2, 4-pentane-diol, glycerol, terpene alcohol, alphaterpineol, fenchyl alcohol, and hydroabietyl alcohol are useful.

Ketones such as acetone, methyl acetone, methyl ethyl ketone, methyl n-propyl ketone, methyl isobutyl ketone, methyl n-amyl ketone, ethyl butyl ketone, di-n-propyl ketone, methyl hexyl ketone, diisobutyl ketone, diacetone alcohol, acetonyl acetone, mesityl oxide, cyclohexanone, methyl cyclohexanone, isophorone, and fenchone are suitable.

Ethers including ethyl ether, isopropyl ether, n-butyl ether, diamyl ether, n-hexyl ether, ethylene glycol monomethyl ether, mono and dialkyl ethers of ethylene glycol and their derivatives marketed by Union Carbide Corporation under the trademark "Cellosolve," ethylene glycol mono-n-butyl-ether, ethylene glycol monophenyl ether, ethylene glycol monobenzyl ether, a series of glycol monoethers marketed by The Dow Chemical Company under the trademarks "Dowanol" 4, 2, 3 and diethylene glycol monomethyl ether, diethylene glycol monoethyl ether, diethylene glycol monobutyl ether, diethyl acetal, 1,2-propylene oxide, 1,4-dihydropyran, pentamethylene oxide, trioxane, terpinyl methyl ether, terpinyl ethylene glycol ether, dichloroethyl ether, triglycol dichloride, glyceryl α-monomethyl ether, glyceryl α,γ-dimethyl ether, glyceryl α-mono-n-butyl ether, glyceryl α-monoisamyl ether, and glyceryl α-γ-diisoamyl ether can be used.

Examples of esters which can be employed include methyl acetate, ethyl acetate, n-propyl acetate, isopropyl acetate, n-butyl acetate, sec-butyl acetate, isobutyl acetate, amyl acetate, sec-amyl acetate, pentacetate, methyl amyl acetate, 2-ethyl butyl acetate, cyclohexyl acetate, methyl cyclohexanyl acetate, ethylene glycol monoacetate, glycol diacetate, ethylene glycol monoethyl ether acetate, ethylene glycol monoethyl ether acetate, methoxy butyl acetate, methyl propionate, ethyl propionate, n-butyl propionate, amyl propionate, ethyl butyrate, methyl butyrate, n-butyl butyrate, ethyl hydroxy-iso-butyrate, diethyl carbonate, diethyl oxalate, dibutyl oxalate, diamyl oxalate, methyl formate, ethyl formate, butyl formate, amyl formate, methyl lactate, ethyl lactate, and butyl lactate.

Most of the above-described solvents are quite immiscible with the aqueous acid components, although certain of the more polar compounds will be at least partially soluble in the aqueous component. In order that the treating composition has a substantially uniform composition, it is necessary to add an emulsifying agent to emulsify or disperse any immiscible phases. Suitable anionic, cationic, nonionic, and amphoteric surface active agents are widely known in the art as emulsifying agents. The emulsifying agent is used in an amount effective to form an emulsion or a dispersion. Generally, about 0.1 to 5 parts by weight emulsifying agent per 100 combined parts by weight organic solvent component and acid component are used. Anionic and nonionic emulsifying agents are preferred. Suitable anionic emulsifying agents include alkyl aryl sulfonates, fatty alcohol sulfates, sulfated and sulfonated amides and amines, sulfated and sulfonated esters and ethers, and alkyl sulfonates. Suitable nonionic emulsifying agents include products obtained by autocondensation of fatty matters and their derivatives with ethylene oxide and/or propylene oxide. Examples of fatty matters are fatty acids, alcohols, esters, aldehydes, and amines. Other nonionic emulsifying agents are products obtained by condensation of phenolic compounds having lateral side chains with ethylene oxide and/or propylene oxide.

Broadly, the emulsifying agents and the foaming agents of this invention are both surface active agents. To some extent, both types of agents have the ability to form both an emulsion and a foam. However, to form a treating composition having a high stability, it is necessary to employ both types of surface active agents.

Some surface active agents are incompatible. Thus, certain anionic and cationic surface active agents are often not used together because one tends to precipitate the other. However, an anionic emulsifying agent can be used with the particular foaming agents of this invention without formation of a precipitate.

The foam can be generated by combining the liquid ingredients in any desired order and introducing the gas into the liquid with agitation. Conveniently, a volume of acid component is placed in a suitable mixing container and, if a diluted acid is desired, mixed with water to form an aqueous acid solution. For example, with the commonly used hydrochloric acid, the commercially available aqueous solution containing about 28 percent by weight hydrochloric acid is diluted to form an aqueous solution containing about 5 to 15 percent by weight hydrochloric acid. Corrosion inhibitors and other additives are added to this aqueous solution. Next, the two foaming agents are mixed into the aqueous acid solution in any order desired or simultaneously. The organic solvent component and emulsifying agent, if used, are added to the mixing container. While the resulting mixture is agitated, the gas is introduced to form the foam. While the foam can be prepared batchwise, it is also possible to prepare it in a continuous operation wherein the aqueous solution of the acid component and the foaming agent mixture is introduced into a conduit at the same time as the organic solvent and emulsifying agent, if used, and the gas is introduced into the conduit as the mixture is moving through it. The foam formed is then led to a point of use.

For treating oil wells and/or the surrounding formations, or pipes or vessels which contain oil, the foam must have stability in the presence of crude oil, since contact of the foam with crude oil is inevitable during the treatment. Due to the destabilizing effect of crude oils on foams, an initially stable prepared foam can destabilize after contacting crude oil, but before it contacts scale or the formation. Therefore, tests of foam stability in Examples 1 through 8, which follow, are conducted with crude oil present.

Further, since many oil wells, formations, and industrial units develop alkaline earth metal carbonate-based scales, it is desirable that foamed acids maintain stability after contacting compounds such as calcium carbonate.

In removing scale from an industrial unit, the foam can be introduced into the unit into contact with the scale and allowed to stand for a length of time sufficient to remove the scale. Alternatively, the foam can be continuously passed through the unit, for example, a conduit, during the treatment.

In treating wells and/or the surrounding subterranean reservoir, the foam can be introduced to the bottom of the well via a conduit suspended in the well or via the annulus between such a conduit and the sidewall of the well. At the bottom of the well, the foam can be circulated back to the surface or, by applying a pressure to the foam that exceeds the reservoir pressure, the foam can be forced out into the reservoir.

The invention is further illustrated by the following examples which are illustrative of various aspects of the invention and are not intended as limiting the scope of the invention as defined by the appended claims.

EXAMPLES 1 THROUGH 14

A series of laboratory tests demonstrates the stability of foam made using the foaming agent mixture of this invention, even in the presence of organic solvent and emulsifying agent components, additives, and contaminants.

There are placed in an 800-milliliter beaker 104 grams of an 8.5 percent by weight aqueous solution of hydrochloric acid, 0.5 grams of a mixture of an amine, an acetylenic alcohol, and a cuprous salt as a corrosion inhibitor, and various amounts of foaming agents. There are also added 16.8 grams naphtha as an organic solvent component and 1.0 grams alkyl aryl sulfonate anionic emulsifying agent. To certain of the test compositions, crude oil, calcium carbonate, and/or an anti-sludge agent additive (a water-soluble alkyl phenol) are also added. The mixture is beaten vigorously for two minutes with a manual egg beater to incorporate air and form a foam. The foam is transferred to a 500-milliliter graduated cylinder having a diameter of about 5 centimeters, contaminants are added, if used, and the time for one-half the liquid volume (55 milliliters) to drain from the foam is determined. A longer drain half-life is indicative of a more srable foam. The results of these tests are summarized in Table 1.

The foaming agents used in these tests are as follows:

| Agent | Manufacturer's Designation | Description |
|---|---|---|
| A | Arquad 12-50 (Armak Co.) | 50 percent by weight N—alkyl trimethyl ammonium chloride wherein the alkyl group contains from 12 to 16 carbon atoms and is derived from coconut oil. |
| B | Deriphat BA (Henkel, Inc.) | 60 percent by weight cocoamido betaine. |
| C | Textamine Oxide CA (Henkel, Inc.) | 50 percent by weight cocoylamido alkylamine oxide wherein the alkyl group contains about 12 to 16 carbon atoms. |

TABLE 1

| Example | Foaming Agent Mixture Foaming Agent (Parts by wt.) | Foaming Agent (Parts by wt.) | Crude Oil (Parts by wt.) | CaCO₃ (Parts by wt.) | Anti-Sludge Agent (Parts by wt.) | Drain Half-Life (Seconds) |
|---|---|---|---|---|---|---|
| 1  | 1 A   | —     | 5 | — | —    | 173 |
| 2  | —     | 1 B   | 5 | — | —    | 0   |
| 3  | 0.5 A | 0.5 B | 5 | — | —    | 292 |
| 4  | 1 A   | —     | 5 | — | —    | 173 |
| 5  | —     | 1 C   | 5 | — | —    | 0   |
| 6  | 0.5 A | 0.5 C | 5 | — | —    | 427 |
| 7  | 0.5 A | 0.5 B | 5 | 5 | —    | 243 |
| 8  | 0.5 A | 0.5 C | 5 | 5 | 0.25 | 234 |
| 9  | 1 A   | —     | — | — | —    | 319 |
| 10 | —     | 1 B   | — | — | —    | 0   |
| 11 | 0.5 A | 0.5 B | — | — | —    | 293 |
| 12 | 1 A   | —     | — | — | —    | 319 |
| 13 | —     | 1 C   | — | — | —    | 153 |
| 14 | 0.5 A | 0.5 C | — | — | —    | 439 |

Examples 1 through 6 show that mixtures of foaming agents produce significantly more stable foams, in the presence of crude oil, than do the individual foaming agents.

Examples 7 and 8 indicate that neither calcium carbonate nor an anti-sludge agent commonly used in oil well acidizing mixtures totally inhibit the action of the foaming agent mixtures. It should be noted that longer half-lives are obtained with the mixed contaminants than observed for foaming agent A alone, in the presence of only crude oil contamination.

Examples 9 through 14 demonstrate the properties of foams as they would be produced, prior to use in wells or industrial equipment. These uncontaminated foaming agent mixtures are generally comparable to agent A alone in producing stable foams, but are superior to agents B or C individually. Comparison of results with those obtained in Examples 1 through 6, however, shows that foam stabilities with the mixed foaming agents are not significantly affected by adding a crude oil contaminant, while stabilities with the individual foaming agents are greatly decreased.

EXAMPLE 15

The production from an Orange County, Calif., oil well declines from 78/61 (gross/net oil) barrels per day to 34/23 (gross/net oil) barrels per day. This decline in production is due to the deposition of an oily calcium carbonate scale in both the well and the formation rock in the vicinity of the well. It is desired to dissolve this scale with an emulsion of an aqueous acid solution and an aromatic solvent. Because the well has over 1,500 feet of producing interval, it is preferred to use the emulsion in foam form to more efficiently and uniformly distribute the treating fluid over the entire producing interval. The foam also facilitates well clean-up after treatment due to the release of pressure of the compressed gas when the well is returned to production, and because foam is a good carrier for fine particles dislodged by the treatment when the foam backflows out of the well. The well is treated in three stages.

(1) First, a drill bit is run through the slotted liner extending over the producing interval to mechanically remove the scale build-up on the interior of the liner.

(2) Next, the liner and the sidewall of the well are treated with a foamed acid-solvent emulsion in a manner to minimize invasion of the reservoir by the treating composition. There are admixed in a tank 640 gallons of a 15 percent by weight aqueous solution of hydrochloric acid, 4 gallons of a mixture of an amine, an acetylenic alcohol and a cuprous salt as a corrosion inhibitor, 160 gallons of super-high flash-point naphtha as an aromatic solvent, 14 gallons of an alkyl aryl sulfonate emulsifying agent, and, as a foaming agent mixture, 30 gallons of a 50 percent by weight aqueous solution of a 12 to 15 carbon atom N-alkyl trimethylammonium chloride and 6 gallons of a 60 percent by weight aqueous solution of cocoamido betaine. The 850 gallons of emulsion are pumped into 2⅜-inch tubing at the rate of about 0.65 gallons per minute and a pressure ranging from 600 to 1,150 pounds per square inch (psi). Simultaneously, there are pumped into the tubing about 27,600 standard cubic feet (SCF) of nitrogen at the rate of 750 to 800 SCF per minute. Valves at the surface in communication with the tubing-casing annulus are open so the fluid injected down the tubing tends to be displaced through the liner, up the annulus and out of the well rather than penetrating the reservoir to any extent. After the treating fluid is pumped down the tubing, the fluids remaining in the well are lifted to the surface by reverse circulation wherein 82,650 SCF of nitrogen are injected down the annulus and fluids are produced up the tubing.

(3) After the well is cleaned out in this manner, a packer is positioned in the annulus so that any fluid subsequently injected down the tubing is forced out into the reservoir. About 14,640 gallons of emulsion are prepared as described above by combining 11,360 gallons of 15 percent by weight aqueous solution of hydrochloric acid, 2,840 gallons of super-high flash-point naphtha, 241 gallons of alkyl aryl sulfonate emulsifier; 71 gallons of the above-described corrosion inhibitor, 25 gallons of a 50 percent by weight aqueous solution of a 12 to 15 carbon atom N-alkyl trimethylammonium chloride and 103 gallons of a 60 percent by weight aqueous solution of cocoamido betaine. Emulsion is pumped down the tubing at an injection rate of about 0.5 to 1.5 barrels per minute while simultaneously pumping nitrogen into the tubing at a rate of 800/1,200 SCF per minute and a pump pressure of 1,000 to 2,000 p.s.i. to form a foam. After each 3,500-gallon segment of emulsion is pumped in this manner, the ratio of gas to liquid being injected is increased by increasing the pumping rate of nitrogen to 1,700 SCF per minute. After 500 gallons of emulsion are pumped under these conditions, the pumping rate of nitrogen is lowered to 800 SCF per minute for the next 3,500-gallon segment of emulsion. This change in volume of fluids injected is an effort to create a series of relatively small slugs of foam having a relatively high viscosity alternately with a series of relatively large slugs of foam having a lower viscosity. The slugs of high viscosity foam act as a divertng agent in the reservoir to change the flow path of the main body of foam being injected. After the entire 14,640 gallons of emulsion and 400,000 SCF of nitrogen have been pumped, the foam remaining in the injection tubing is displaced out into the reservoir by injecting an additional 4,800 SCF of nitrogen. The well is immediately returned to production through the former injection string. The well flows for about one hour and is then returned to production by a rod pump.

EXAMPLE 16

A 5,000-gallon cylindrical industrial tank is coated with a scale consisting of a mixture of an oil sludge and iron oxide. It is desired to remove this scale using a minimum amount of solvent. In a 500-gallon paddle-mixing tank, there are introduced 300 gallons of a 10 percent by weight aqueous solution of citric acid, 2 gallons of alkyl pyridines corrosion inhibitor, 7 gallons of octyl phenol condensed with 10 moles of ethylene oxide as a nonionic emulsifying agent, 90 gallons of methyl ethyl ketone as an aromatic solvent, and, as a foaming agent mixture, 8 gallons of 100 percent active cetylpyridinium chloride and 5 gallons of a 50 percent by weight aqueous solution of cocoylamido alkylamine oxide wherein the alkyl group contains about 12 to 16 carbon atoms. The mixture is agitated to form an emulsion. The emulsion is pumped into one leg of a T-conduit leading to the industrial tank at a rate of about 10 gallons per minute. Into the other leg of the T-conduit are injected 1,000 SCF per minute of air. A foam forms as the emulsion and air meet and pass through the conduit leading to the industrial tank. The industrial tank is filled with foam and allowed to sit for 8 hours. At the end of this time, the foam is flushed from the tank with water. A visual examination of the tank shows that the scale has been substantially completely removed.

While particular embodiments of the invention have been described, it will be understood, of course, that the invention is not limited thereto since many modifications can be made and it is intended to include within the invention such modifications as are within the scope of the claims.

I claim:

1. A foam-treating fluid composition comprising:
   (a) about 5 to 99 parts by weight of an aqueous solution of an acid component selected from the group consisting of mineral acids, and organic carboxylic acids, which form water-soluble or acid-soluble salts of alkali metals and alkaline earth metals, the solution having a pH value less than about 3;
   (b) about 0.04 to 1,200 parts by weight of a gas;
   (c) about 1 to 95 parts by weight of a water immiscible organic solvent, and an emulsifying agent; and
   (d) about 0.1 to 10 parts by weight of a foaming agent mixture comprising:
      (i) 0.01 to 9.5 parts by weight of a quaternary ammonium compound surface active agent; and
      (ii) 9.5 to 0.01 parts by weight of an additive consisting essentially of either: an alkylamido alkylamine oxide surface active agent having the formula:

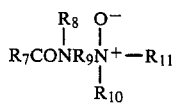

wherein $R_7$ is an alkyl group containing 2 to about 18 carbon atoms, $R_8$ is hydrogen or a substituted or unsubstituted, branched or unbranched alkyl group containing 1 to about 18 carbon atoms, $R_9$ is a substituted or unsubstituted, branched or unbranched, alkylene group containing 1 to about 18 carbon atoms, and $R_{10}$ and $R_{11}$ are each substituted or unsubstituted, branched or unbranched, alkyl groups containing 1 to about 18 carbon atoms; or an amphoteric betaine surface active agent having the formula:

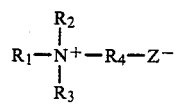

wherein $R_1$ is a high molecular weight substituted or unsubstituted alkyl radical having about 10 to 20 carbon atoms, or is an amido group having the formula:

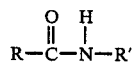

wherein R is a substituted or unsubstituted alkyl radical having about 10 to about 20 carbon atoms and R' is an alkylene radical having about 2 to about 4 carbon atoms or is a cycloalkylene radical, $R_2$ and $R_3$ are each substituted or unsubstituted alkyl radicals having about 1 to 3 carbon atoms, $R_4$ is an alkylene or hydroxyalkylene radical having about 1 to 4 carbon atoms, and Z is an anion selected from the group consisting of $SO_3^=$ and $COO^=$ radicals.

2. The composition defined in claim 1 wherein the organic solvent is selected from the group consisting of polar solvents, hydrocarbon solvents, halogenated hydrocarbon solvents, and mixtures thereof.

3. The composition defined in claim 1 wherein the acid component is a mineral acid.

4. The composition defined in claim 3 wherein the mineral acid is hydrochloric acid.

5. The composition defined in claim 1 wherein the gas is selected from the group consisting of air, nitrogen, natural gas, methane, butane and carbon dioxide.

6. The composition defined in claim 1 wherein the emulsifying agent is present in the amount of about 0.05 to 5 parts by weight per 100 parts by weight combined acid component and organic solvent.

7. The composition defined in claim 1 wherein the emulsifying agent is selected from the group consisting of water-soluble anionic, cationic, nonionic and amphoteric surface active agents.

8. The composition defined in claim 1 wherein the emulsifying agent is selected from the group consisting of water-soluble anionic and nonionic surface active agents.

9. The composition defined in claim 1 wherein the quaternary ammonium compound is a quaternary ammonium chloride.

10. The composition defined in claim 1 wherein the quaternary ammonium compound is selected from the group consisting of compounds corresponding to the formulae:

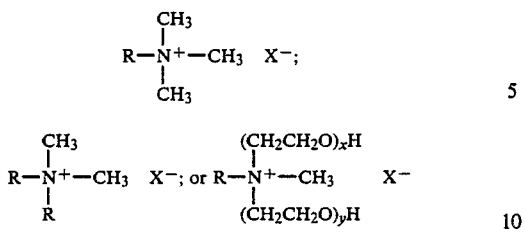

wherein the R groups are the same or different straight chain, branched, or cyclic organic groups which are saturated or unsaturated, substituted or unsubstituted groups containing from about 2 to about 18 carbon atoms; X is an anion selected from the group consisting of chloride, iodide, bromide, and sulfate; and x and y are about 1 to 20.

11. The composition defined in claim 1 wherein the additive of subparagraph (c)(ii) is cocoylamido alkylamine oxide, in which the alkyl group contains about 12 to about 16 carbon atoms.

12. The composition defined in claim 1 wherein the additive of subparagraph (c)(ii) is cocoamido betaine.

13. The composition defined in claim 1 wherein the additive of (c) (ii) is an alkylamido alkylamine oxide surface active agent having the formula

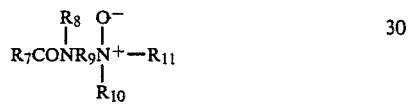

wherein $R_7$ is an alkyl group containing 1 to about 18 carbon atoms, $R_8$ is hydrogen or a substituted or unsubstituted, branched or unbranched alkyl group containing 1 to about 18 carbon atoms, $R_9$ is a substituted or unsubstituted, branched or unbranched, alkylene group containing 1 to about 18 carbon atoms, and $R_{10}$ and $R_{11}$ are each substituted or unsubstituted, branched or unbranched, alkyl groups containing 1 to about 18 carbon atoms.

14. A foamed emulsion treating fluid composition for dissolving acid-soluble portions of a surface and acid-soluble scale present on the surface consisting essentially of:

(a) about 25 to 95 parts by weight of an aqueous solution of mineral acids, or organic carboxylic acids, which form water-soluble or acid-soluble salts of alkali metals and alkaline earth metals, the solution having a pH value less than about 3;

(b) about 10 to 800 parts by weight of a gas selected from the group consisting of air, nitrogen, natrual gas, methane, butane and carbon dioxide;

(c) about 5 to 40 parts by weight of a water immiscible organic solvent selected from the group consisting of polar solvents, hydrocarbon solvents, halogenated hydrocarbon solvents, and mixtures thereof;

(d) about 0.05 to 5 parts by weight per 100 parts by weight of said combined aqueous solution of said mineral acid or said organic carboxylic acid and said organic solvent, of an emulsifying agent selected from the group consisting of water-soluble anionic and nonionic surface active agents; and (e) about 0.2 to 5 parts by weight of a foaming agent mixture comprising:

(i) 0.1 to 5 parts by weight of a quaternary ammonium compound selected from the group consisting of compounds corresponding to the formulae:

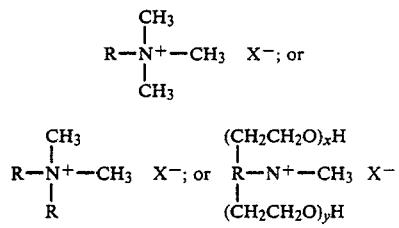

wherein the R groups are the same or different straight chain, branched, or cyclic organic groups which are saturated or unsaturated, substituted or unsubstituted groups containing about 2 to about 18 carbon atoms; X is an anion selected from the group consisting of chloride, iodide, bromide, and sulfate; and x and y can range from about 1 to 20; and (ii) 5 to 0.1 parts by weight of an additive which either: is an alkylamido alkylamine oxide surface active agent having the formula:

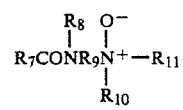

wherein $R_7$ is an alkyl group containing 1 to about 18 carbon atoms, $R_8$ is hydrogen or a substituted or unsubstituted, branched or unbranched alkyl group containing 1 to about 18 carbon atoms, $R_9$ is a substituted or unsubstituted, branched or unbranched, alkylene group containing 1 to about 18 carbon atoms, and $R_{10}$ and $R_{11}$ are each substituted or unsubstituted, branched or unbranched, alkyl groups containing 1 to about 18 carbon atoms; or is an amphoteric betaine surface active agent having the formula:

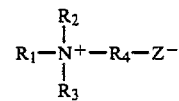

wherein $R_1$ is a high molecular weight alkyl radical having about 10 to 20 carbon atoms, or is an amido group having the formula:

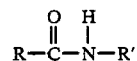

wherein R is a substituted or unsubstituted alkyl radical having about 10 to about 20 carbon atoms and R' is an alkylene radical having about 2 to about 4 carbon atoms or is a cycloalkylene radical, $R_2$ and $R_3$ are each alkyl radicals having about 1 to 3 carbon atoms, $R_4$ is an alkylene or hydroxyalkylene radical having about 1 to 4 carbon atoms, and Z is an anion selected from the group consisting of $SO_3^=$ and $COO^=$ radicals.

15. The composition defined in claim 14 wherein the additive of (c) (ii) is an alkylamido alkylamine oxide surface active agent having the formula

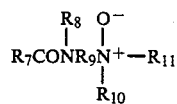

wherein $R_7$ is an alkyl group containing 1 to about 18 carbon atoms, $R_8$ is hydrogen or a substituted or unsubstituted, branched or unbranched alkyl group containing 1 to about 18 carbon atoms, $R_9$ is a substituted or unsubstituted, branched or unbranched, alkylene group containing 1 to about 18 carbon atoms, and $R_{10}$ and $R_{11}$ are each substituted or unsubstituted, branched or unbranched, alkyl groups containing 1 to about 18 carbon atoms.

16. A method for removing scale from a surface comprising contacting the scale with a foam treating fluid composition comprising:
(a) about 5 to 99 parts by weight of an aqueous solution of an acid component selected from the group consisting of mineral acids, and organic carboxylic acids, which form water-soluble or acid-soluble salts of alkali metals and alkaline earth metals, the solution having a pH value less than about 3;
(b) about 0.04 to 1,200 parts by weight of a gas;
(c) about 1 to 95 parts by weight of a water immiscible organic solvent, and an emulsifying agent; and
(d) about 0.1 to 10 parts by weight of a foaming agent mixture comprising:
(i) 0.01 to 9.5 parts by weight of a quaternary ammonium compound surface active agent; and
(ii) 9.5 to 0.01 parts by weight of an additive consisting essentially of either: an alkylamido alkylamine oxide surface active agent having the formula:

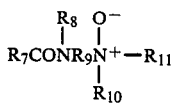

wherein $R_7$ is an alkyl group containing 1 to about 18 carbon atoms, $R_8$ is hydrogen or a substituted or unsubstituted, branched or unbranched alkyl group containing 1 to about 18 carbon atoms, $R_9$ is a substituted or unsubstituted, branched or unbranched, alkylene group containing 1 to about 18 carbon atoms, and $R_{10}$ and $R_{11}$ are each substituted or unsubstituted, branched or unbranched, alkyl groups containing 1 to about 18 carbon atoms; or an amphoteric betaine surface active agent having the formula:

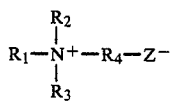

wherein $R_1$ is a high molecular weight substituted or unsubstituted alkyl radical having about 10 to 20 carbon atoms, or is an amido group having the formula:

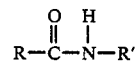

wherein R is a substituted or unsubstituted alkyl radical having about 10 to about 20 carbon atoms and R' is an alkylene radical having about 2 to about 4 carbon atoms or is a cycloalkylene radical, $R_2$ and $R_3$ are each substituted or unsubstituted alkyl radicals having about 1 to 3 carbon atoms, $R_4$ is an alkylene or hydroxyalkylene radical having about 1 to 4 carbon atoms, and Z is an anion selected from the group consisting of $SO_3^=$ and $COO^=$ radicals.

17. The method defined in claim 16 wherein the organic solvent is selected from the group consisting of polar solvents, hydrocarbon solvents, halogenated hydrocarbon solvents and mixtures thereof.

18. The method defined in claim 16 wherein the acid component is a mineral acid.

19. The method defined in claim 18 wherein the mineral acid is hydrochloric acid.

20. The method defined in claim 16 wherein the gas is selected from the group consisting of air, nitrogen, natural gas, methane, butane and carbon dioxide.

21. The method defined in claim 16 wherein the emulsifying agent is present in the amount of about 0.05 to 5 parts by weight per 100 parts by weight combined acid component and organic solvent.

22. The method defined in claim 16 wherein the emulsifying agent is selected from the group consisting of water-soluble anionic, cationic, nonionic and amphoteric surface active agents.

23. The method defined in claim 16 wherein the emulsifying agent is selected from the group consisting of water-soluble anionic and nonionic surface active agents.

24. The method defined in claim 16 wherein the quaternary ammonium compound is a quaternary ammonium chloride.

25. The composition defined in claim 16 wherein the quaternary ammonium compound is selected from the group consisting of compounds corresponding to the formulae:

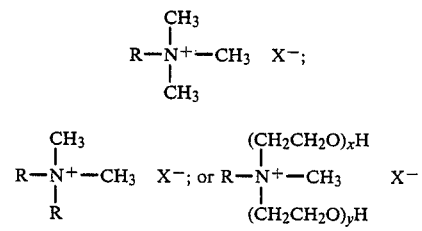

wherein the R groups are the same or different straight chain, branched, or cyclic organic groups which are saturated or unsaturated, substituted or unsubstituted groups containing from about 2 to about 18 carbon atoms; X is an anion such as chloride, iodide, bromide, sulfate and the like; and x and y range from about 1 to 20.

26. The composition defined in claim 16 wherein the additive of subparagraph (c)(ii) is cocoylamido alkylamine oxide, in which the alkyl group contains about 12 to about 16 carbon atoms.

27. The method defined in claim 16 wherein the additive of subparagraph (c)(ii) is cocoamido betaine.

28. The method defined in claim 16 wherein the additive of (c) (ii) is an alkylamido alkylamine oxide surface active agent having the formula

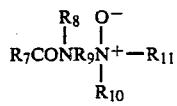

wherein $R_7$ is an alkyl group containing 1 to about 18 carbon atoms, $R_8$ is hydrogen or a substituted or unsubstituted, branched or unbranched alkyl group containing 1 to about 18 carbon atoms, $R_9$ is a substituted or unsubstituted, branched or unbranched, alkylene group containing 1 to about 18 carbon atoms, and $R_{10}$ and $R_{11}$ are each substituted or unsubstituted, branched or unbranched, alkyl groups containing 1 to about 18 carbon atoms.

29. A method for increasing the permeability of a subterranean geological reservoir penetrated by a well and filter media present in the well which comprises introducing through the said well and into the reservoir surrounding the well a foam composition consisting essentially of:
(a) about 5 to 99 parts by weight of an aqueous solution of an acid component selected from the group consisting of mineral acids, and organic carboxylic acids, which form water-soluble or acid-soluble salts of alkali metals and alkaline earth metals, the solution having a pH value less than about 3;
(b) about 0.04 to 1,200 parts by weight of a gas;
(c) about 1 to 95 parts by weight of a water immiscible organic solvent, and an emulsifying agent; and
(d) about 0.1 to 10 parts by weight of a foaming agent mixture comprising:
(i) 0.1 to 9.5 parts by weight of a quaternary ammonium compound surface active agent; and
(ii) 9.5 to 0.01 parts by weight of an additive which either: is an alkylamido alkylamine oxide surface active agent having the formula:

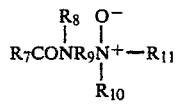

wherein $R_7$ is an alkyl group containing 1 to about 18 carbon atoms, $R_8$ is hydrogen or a substituted or unsubstituted, branched or unbranched alkyl group containing 1 to about 18 carbon atoms, $R_9$ is a substituted or unsubstituted, branched or unbranched, alkylene group containing 1 to about 18 carbon atoms, and $R_{10}$ and $R_{11}$ are each substituted or unsubstituted, branched or unbranched, alkyl groups containing 1 to about 18 carbon atoms; or is an amphoteric betaine surface active agent having the formula:

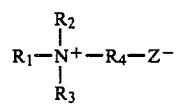

wherein $R_1$ is a high molecular weight substituted or unsubstituted alkyl radical having about 10 to 20 carbon atoms, or is an amido group having the formula:

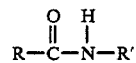

wherein R is a substituted or unsubstituted alkyl radical having about 10 to about 20 carbon atoms and R' is an alkylene radical having about 2 to about 4 carbon atoms or is a cycloalkylene radical, $R_2$ and $R_3$ are each substituted or unsubstituted alkyl radicals having about 1 to 3 carbon atoms, $R_4$ is an alkylene or hydroxyalkylene radical having about 1 to 4 carbon atoms, and Z is an anion selected from the group consisting of $SO_3^=$ and $COO^=$ radicals.

30. The method defined in claim 29 wherein the organic solvent is selected from the group consisting of polar solvents, hydrocarbon solvents, halogenated hydrocarbon solvents, and mixtures thereof.

31. The method defined in claim 29 wherein the acid component is a mineral acid.

32. The method defined in claim 31 wherein the mineral acid is hydrochloric acid.

33. The method defined in claim 29 wherein the gas is selected from the group consisting of air, nitrogen, natural gas, methane, butane and carbon dioxide.

34. The method defined in claim 29 wherein the emulsifying agent is present in the amount of about 0.05 to 5 parts by weight per 100 parts by weight combined acid component and organic solvent.

35. The method defined in claim 29 wherein the emulsifying agent is selected from the group consisting of water-soluble anionic, cationic, nonionic and amphoteric surface active agents.

36. The method defined in claim 29 wherein the emulsifying agent is selected from the group consisting of water-soluble anionic and nonionic surface active agents.

37. The method defined in claim 29 wherein the quaternary ammonium compound is a quaternary ammonium chloride.

38. The method defined in claim 29 wherein the quaternary ammonium compound is selected from the group consisting of the compounds corresponding to the formulae:

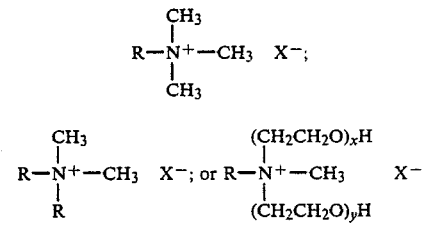

wherein the R groups are the same or different straight chain, branched, or cyclic organic groups which are saturated or unsaturated, substituted or unsubstituted groups containing about 2 to about 18 carbon atoms; X is an anion selected from the group consisting of chloride, iodide, bromide, and sulfate; and x and y are about 1 to 20.

39. The method defined in claim 29 wherein the additive of subparagraph (c)(ii) is cocoylamido alkylamine oxide, in which the alkyl group contains about 12 to about 16 carbon atoms.

40. The method defined in claim 29 wherein the additive of subparagraph (c)(ii) is cocoamido betaine.

41. A method for dissolving acid-soluble portions of a subterranean reservoir penetrated by a well, acid-soluble scale present in the reservoir and the well and oil-soluble deposits present in the reservoir and the well by contacting the reservoir, scale and deposits with a foamed emulsion consisting essentially of:
(a) about 15 to 95 parts by weight of an aqueous solution of hydrochloric acid,
(b) about 10 to 800 parts by weight air or nitrogen,
(c) about 5 to 40 parts by weight of naphtha,
(d) about 0.05 to 5 parts by weight, per 100 parts by weight of said combined aqueous solution of hydrochloric acid and naphtha, of an anionic or nonionic water-soluble surface active agent and emulsifying agent,
(e) about 0.2 to 5 parts by weight of a foaming agent mixture comprising:
  (i) 0.1 to 5 parts by weight of an N-alkyl trimethyl ammonium chloride derived from coconut oil, and
  (ii) 5 to 0.1 parts by weight of cocoamido betaine.

* * * * *